United States Patent [19]

Murphy et al.

[11] 4,320,047
[45] Mar. 16, 1982

[54] CURABLE THIXOTROPIC EPOXY/AMINE TERMINATED LIQUID POLYMER COMPOSITIONS

[75] Inventors: Walter T. Murphy, Cuyahoga Falls; Clifford D. Guiley, Jr., Medina, both of Ohio

[73] Assignee: The B. F. Goodrich Company, Akron, Ohio

[21] Appl. No.: 206,734

[22] Filed: Nov. 13, 1980

[51] Int. Cl.$^3$ ................................................. C08K 5/15
[52] U.S. Cl. .................................... 523/457; 523/466; 523/467
[58] Field of Search .................. 260/37 EP, 42.28

[56] References Cited

U.S. PATENT DOCUMENTS 3,396,138  8/1968  Weller ............................... 260/42.28
4,055,541 10/1977  Riew ................................ 260/37 EP
4,129,670 12/1978  Riew ................................ 260/37 EP Primary Examiner—Lewis T. Jacobs
Attorney, Agent, or Firm—George A. Kap; Nestor W. Shust

[57] ABSTRACT

A curable thixotropic composition comprising an amine terminated liquid polymer and a novel combination of fumed silica and a mildly alkaline particulate substance in sufficient amount to accelerate gel time of the composition.

6 Claims, No Drawings

CURABLE THIXOTROPIC EPOXY/AMINE TERMINATED LIQUID POLYMER COMPOSITIONS

BACKGROUND OF THE INVENTION

Fumed silica is a known thickening and thixotropic agent. As little as 1% thereof by weight can make free-flowing liquids viscous or turn a heavy liquid into a paste. By controlling viscosity, fumed silica aids in the manufacture of dripless surface coatings, non-sagging sealants, and adhesives even at elevated temperatures.

It was found that when fumed silica is added to a system containing an amine terminated reactive liquid polymer (ATRLP) and an epoxy resin in sufficient amount to produce the desired thixotropic characteristic, such a system would retard both the gel time and cure. However, when levels of fumed silica were reduced to where the gel time of the ATRLP/epoxy systems was not affected, the systems did not exhibit sufficient thixotropic characteristics. To promote the desired thixotropic property, alternate solid mildly alkaline materials were tried, such as silicate clays and calcium carbonate fillers. Unfortunately, these alternate materials did not impart the sufficient thixotropic property to the ATRLP/epoxy systems. As was expected, however, they did appear to selectively accelerate the cure of the ATRLP/epoxy systems. The next step was to increase levels of fumed silica to impart sufficient thixotropic characteristics at levels which previously retarded the cure of ATRLP/epoxy systems and admix the mildly alkaline materials to accelerate the cure. It was then discovered that thixotropic ATRLP/epoxy systems containing fumed silica and solid mildly alkaline materials did result in compositions having accelerated gel times.

SUMMARY OF THE INVENTION

This invention relates to addition of a solid mildly alkaline material, such as aluminum silicate clay or calcium carbonate filler, to thixotropic ATRLP/epoxy systems containing fumed silica to accelerate gel times of such systems. More specifically, this invention relates to a composition of matter which is thixotropic and curable at room temperature comprising ATRLP/epoxy resin, sufficient amount of fumed silica to render the composition thixotropic, and sufficient amount of the mildly solid alkaline material to accelerate gel times thereof.

DETAILED DESCRIPTION OF THE INVENTION

Normally, addition of fumed silica as a thickening or a thixotropic agent to a curable composition does not affect gel times thereof. However, we have discovered that compositions containing ATRLP/epoxy resins and enough fumed silica to render the compositions thixotropic did retard gel times. More specifically, to obtain thixotropic characteristics in unplasticized prior art compositions containing ATRLP/epoxy resins, it is preferable to admix more than 2 parts by weight of fumed silica per 100 parts of the ATRLP/epoxy resin, however, presence of more than 1 part of fumed silica retards gel times of such compositions. Addition of mildly alkaline materials to compositions containing ATRLP/epoxy resin has permitted the use of enough fumed silica to obtain the desired thixotropic characteristics and yet has accelerated gel times of such compositions.

Thixotropic ATRLP/epoxy resin compositions, especially those that cure at room temperature, have many applications. Such applications include coatings, sealants, caulking compounds paint primers and putties. These compositions also have good adhesion to substrates such as wood, copper and brass.

Thixotropy is a shear-dependent property. On agitation of a thixotropic composition, viscosity will drop, however, it will again increase on standing. Thixotropic index is a measure of the shear-dependent property and is defined as the ratio of viscosity measured at a certain lower rpm to viscosity measured at a certain higher rpm or a ratio of low shear to high shear viscosity measurements. Thixotropic index in excess of 1.00 indicates presence of thixotropy or shear dependency. For applications contemplated herein, thixotropic index should be greater than about 1.5, this index being a ratio of viscosities measured by Brookfield Model RVT with spindle #7 at 20 rpm and 50 rpm at 25° C.

Fumed silica is one of many known thixotropic agents. It is a form of amorphous silica and is prepared by several processes, the principal one involves the reaction of silicon tetrachloride with hydrogen and oxygen in a flame whereby very fine silica and hydrochloric acid are formed. Fumed silica is also known as pyrogenic silica. It is 99%+ pure and has an enormous exterior surface area of 50 to 400 m$^2$/g. It has over $11 \times 10^{15}$ particles per gram, is regarded as super fine, has less than 2% moisture, and has a particle size ranging from 0.007 to 0.05 micron. Its physical configurations are long, branched chains with numerous hydrogen-bonding sites.

In a liquid system, fumed silica chains tend to join one another. The result is a network structure that retards or inhibits the flow of the liquid in which it is dispersed. The more extensive the formation of the network, the more efficient the thickening and thixotropy.

Amount of fumed silica used herein can vary widely from the minimum amount being that which will produce the desired acceptable thixotropic characteristics. More specifically, for compositions containing ATRLP/epoxy resin, amount of fumed silica can vary from 0.5 to 15 parts by weight per 100 parts of ATRLP epoxy resin, preferably 2 to 10 parts, for unplasticized compositions. Since viscosity of plasticized compositions is lower than that of unplasticized compositions, additional fumed silica should be added to compensate for the reduction in viscosity. Amount of fumed silica added to plasticized compositions will depend on the amount and type of plasticizer used, which vary widely.

The function of the solid mildly alkaline materials appears to be in neutralizing the acidic character of fumed silica which retards ATRLP/epoxy resin cure.

The class of suitable solid mildly alkaline materials includes silicate and calcium carbonate substances, preferably aluminum silicate clays and particulate calcium carbonates. Specific examples of this class of materials are aluminum silicates such as bentonite and kaolin, magnesium silicates such as talc, aluminum-potassium silicates such as mica, and of course, the various calcium carbonates. The mildly alkaline materials are preferably in powdered form. To accelerate gel times of the ATRLP/epoxy resins, amount of the mildly alkaline material will depend on many factors, including amount of fumed silica therein. In specific terms, the amount of the mildly alkaline materials can vary from about 1 to 100 parts per 100 parts of ATRLP/epoxy resin, preferably about 5 to 50 parts. In plasticized compositions, the amount of mildly alkaline material would be increased to compensate for the greater amount of fumed silica needed to off-set the viscosity-reducing property of plasticizers.

The amine-terminated reactive liquid polymers suitable for use in this invention have the formula

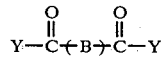

wherein Y is a univalent radical obtained by removing hydrogen from an amine group of an aliphatic, alicyclic, heterocyclic or aromatic amine containing at least two primary and/or secondary amine groups, and B is a polymeric backbone comprising carbon-carbon linkages. Generally, the carbon-carbon linkages comprise at least about 90% by weight and preferably at least about 95% by weight of total polymeric backbone weight. The amine-terminated liquid polymers contain an average of about 1.5 to about 4, preferably about 1.7 to about 2.3 primary and/or secondary amine groups per molecule. The amine-terminated polymers have Brookfield viscosities, measured using a Brookfield RVT viscometer at 27° C. of about 500 cps to about 2,500,000 cps, preferably from about 500 cps to about 500,000 cps.

The amine-terminated liquid polymers can be prepared by reacting a carboxyl-terminated, acid chloride-terminated, or ester-terminated liquid polymer having a carbon-carbon backbone with at least one aliphatic, alicyclic, aromatic or heterocyclic amine containing at least two primary and/or secondary amine groups.

The carboxyl terminated reactive liquid polymers used to prepare ATRLPs have Brookfield viscosities from about 500 cps to about 500,000 cps, more preferably from about 500 cps to about 250,000 cps, and have polymeric backbones comprising carbon-carbon linkages. The carboxyl functional groups are located at least at the ends of a polymer molecule, but there may also be additional group(s) located pendant to a polymer backbone. The average number of total carboxyl groups typically is from about 1.7 to about 3 groups per molecule, more preferably from about 1.7 to 2.3 groups per molecule.

Carboxyl-terminated liquid polymers having carbon-carbon backbone linkages may contain polymerized units of at least one vinylidene monomer having at least one terminal $CH_2=C<$ group and selected from the group consisting of (a) monoolefins containing 2 to 14 carbon atoms, more preferably 2 to 8 carbon atoms, such as ethylene, propylene, isobutylene, 1-butene, 1-pentene, 1-hexene, 1-dodecene, and the like; (b) dienes containing 4 to 10 carbon atoms, more preferably 4 to 8 carbon atoms, such as butadiene, isoprene, 2-isopropyl-1,3-butadiene, chloroprene, and the like; (c) vinyl and allyl esters of carboxylic acids containing 2 to 8 carbon atoms such as vinyl acetate, vinyl propionate, allyl acetate, and the like; (d) vinyl and allyl ethers of alkyl radicals containing 1 to 8 carbon atoms such as vinyl methyl ether, allyl methyl ether, and the like; and (e) acrylic acids and acrylates having the formula

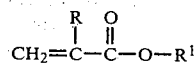

wherein R is hydrogen or an alkyl radical containing 1 to 3 carbon atoms and $R^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl radical containing 1 to 8 carbon atoms. Examples of suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, ethyl methacrylate, octyl methacrylate, and the like. Often two or more types of these polymerized monomeric units are contained in the polymeric backbone.

The vinylidene monomers described above can be polymerized with up to 50% of at least one comonomer selected from vinyl aromatics, vinyl nitriles, vinyl halides, divinyls and diacrylates, amides of unsaturated carboxylic acids, and allyl alcohol.

Liquid carboxyl-terminated polymers may be prepared by free-radical polymerization using carboxyl-containing initiators and/or modifiers as disclosed in U.S. Pat. No. 3,285,949 and German Pat. No. 1,150,205 and by solution polymerization using lithium metal or organometallic compounds and post-treating the polymers to form carboxyl groups as disclosed in U.S. Pat. Nos. 3,135,716 and 3,431,235. The polymers can also be prepared by reacting liquid polymers having other than terminal carboxyl groups with compounds so as to yield carboxyl groups. For example, liquid carboxyl-terminated polymers can be prepared from liquid hydroxyl-terminated polymers by reaction with dicarboxyl compounds or anhydrides. Liquid halogen-terminated polymers can be reacted with unsaturated anhydrides in the presence of Lewis acids to yield carboxyl groups. Thus, it is seen that the method of preparing the liquid carboxyl-terminated polymer is not critical to the invention. The essential features of the polymer are that it have at least terminal carboxyl groups and a polymeric backbone of carbon-carbon linkages.

Examples of preferred liquid carboxyl-terminated polymers include carboxyl-terminated polyethylene, carboxyl-terminated polyisobutylene, carboxyl-terminated polybutadiene, carboxyl-terminated polyisoprene, carboxyl-terminated poly(ethylacrylate), as well as carboxyl-terminated copolymers of butadiene and acrylonitrile and of butadiene and styrene. Carboxyl-terminated copolymers of butadiene with acrylonitrile or styrene were found to be especially useful. These polymers may contain from about 50% to about 100% by weight of butadiene, from about 0% to about 40% by weight of acrylonitrile or styrene and from about 0.4% to about 10% by weight of carboxyl, based upon the total weight of polymer.

Amines which react well with the carboxyl-terminated, ester-terminated and acyl-terminated polymers described heretofore include aliphatic amines containing from 1 to 20 carbon atoms, more preferably from 1 to 12 carbon atoms, and preferably two primary and/or secondary amine groups. Also suitable are alicyclic amines containing from 4 to 20 carbon atoms, more preferably from 4 to 12 carbon atoms, and more preferably two primary and/or secondary amine groups. Heterocyclic amines may also be used which contain from 2 to 20 carbon atoms, more preferably from 2 to 12 carbon atoms, and preferably two primary and/or secondary amine groups. Examples of suitable amines just described include aliphatic amines such as ethylenediamine, 1,2-propanediamine, 2-methyl-1,2-propanediamine, 1,5-pentanediamine, 1,12-dodecanediamine, and the like; aliphatic polyamines such as diethylenetriamine, tetraethylenepentamine, bis(hexamethylene) triamine, 3,3'-iminobispropylamine, and the like; alicyclic diamines and polyamines such as 1,2-diaminocyclohexane, 1,8-p-menthanediamine, and the like; and heterocyclic diamines and polyamines such as 4-(aminomethyl)piperidine; piperazine; N-(aminoalkyl)piperazines wherein each alkyl group contains from 1 to 12 carbon atoms, more preferably 1 to 6 carbon atoms, such as N-(2-aminoethyl)piperazine, N-(3-aminopropyl)piperazine, N,N'-bis(3-aminopropyl)piperazine, and the like.

A solvent is not required for amine termination reaction but it may be used. Suitable solvents include aliphatic and cycloaliphatic ethers, halogenated aliphatic hydrocarbons, esters, and mixtures thereof. No catalyst is required for this reaction which can be carried out at 80° to 150° C. for about 1 to 6 hours. The ATRLP can be purified by vacuum distillation or by washing with a solvent, such as a benzene-methanol mixture, followed by drying.

Epoxy resins suitable for use in this invention together with amine-terminated liquid polymers contain at least an average of about 1.7 epoxy groups per molecule, preferably from about 1.7 to about 3 epoxy groups per molecule, and more preferably from about 1.7 to about 2.3 epoxy groups per molecule. The epoxy resins may be liquids or low-melting solids but are preferably liquids having a bulk viscosity from about 200 centipoises to about 2,000,000 centipoises (measured using a Brookfield RVT viscometer at 25° C.). The epoxy resins can have an epoxy equivalent weight or gram molecular weight per epoxy group from about 70 to about 6,000, preferably from about 70 to about 2,000.

Non-cycloaliphatic epoxy resins are preferred and include epoxidized cyclic silane, epoxidized soybean oil, polyglycidyl esters of polycarboxylic acid, epoxidized polyolefins, and glycidyl ether resins, with glycidyl ether resins being more preferred. A non-cycloaliphatic epoxy resin may be defined as a resin in which an epoxy group is not itself part of a cycloaliphatic ring structure. Examples of suitable polyglycidyl esters of polycarboxylic acids include the diglycidyl ester of linoleic dimer acid, the triglycidyl ester of linoleic trimer acid, and the like. Suitable glycidyl ether resins include diglycidyl ether of bisphenol A; polyallyl glycidyl ether; the diglycidyl ether of chlorendic diol; the diglycidyl ether of dioxanediol; the diglycidyl ether of endomethylene cyclohexanediol; epoxy novolac resins; alkanediol diglycidyl ethers; alkanetriol triglycidyl ethers; and the like.

Cycloaliphatic epoxy resins are less preferred in the compositions of this invention because they tend to produce brittle coatings and may be less reactive than non-cycloaliphatic epoxy resins. By cycloaliphatic epoxy resin is meant a resin in which an epoxy group is itself part of a cycloaliphatic ring structure. Such cycloaliphatic resins include bis(2,3-epoxycyclopentyl)ether, dicyclopentadiene dioxide, the bis(epoxydicyclopentyl)ether of ethylene glycol, 3,4-epoxycyclohexylmethyl-3,4-epoxycyclohexane carboxylate, bis(3,4-epoxycyclohexyl)adipate, and the like.

Reactive diluents and chain extenders are not required although they can be employed. Reactive diluents such as butyl glycidyl ether and chain extenders such as 4,4'-isopropylidene phenol are selected by those skilled in the art to be reactive in the compositions of this invention.

Curing agents can also be used such as polyamines, amidoamines, and the like. As is shown hereinafter, curing catalysts can also be used such as nonylphenol, triethylamine, 2,4,6-tristrimethylaminomethyl phenol, triphenyl phosphine, and the like. Curing agents and curing catalysts are used in preferred embodiments.

Compositions disclosed herein can contain about 1 to 1000 parts by weight of an ATRLP, preferably 20 to 400 parts, per 100 parts by weight of an epoxy resin. Typical property ranges of the ATRLP/epoxy compositions disclosed herein are given in the following Table I:

TABLE I

| Parts by Weight of Amine-Terminated Liquid Polymer[1] Per 100 Parts by Weight of Epoxy Resin[2] | Description | Approximate Tensile Strength psi | Approximate Ultimate Elongation % |
|---|---|---|---|
| About 1–20 | Toughened Plastic | 6000–12000 | 1–15 |
| About 20–100 | Flexibilized Plastic | 2500–7000 | 10–50 |
| About 100–250 | Rigid Elastomer | 2000–4000 | 40–150 |
| About 250–500 | Elastomer | 1000–3000 | 100–500 |
| About 500–1000 | Soft Elastomer | 100–1000 | 300–1000 |

[1]Amine equivalent weight per hundred parts (Ephr) of the ATRLP is 0.1
[2]Diglycidyl ether of bisphenol A epoxy resin used has an epoxy equivalent weight of 175–200

All compositions summarized in Table I are curable at room temperature of about 20°–25° C. In the vicinity of the stoichiometric balance point, curing is most rapid. The compositions are hydrolytically stable and generally do not require a catalyst or curing agent, although a catalyst or curing agent may be used.

In addition to the essential ingredients of ATRLP and an epoxy resin, the compositions of Table I can contain a broad range of other compounding ingredients. These ingredients are typical ingredients used in rubber and/or epoxy compounding. In a preferred embodiment, compositions of Table I are flowable or castable at temperatures ranging from about 20° C. to about 100° C.

A number of examples are presented below for the purpose of demonstrating effectiveness of the solid mildly alkaline materials with respect to accelerating the cure of thixotropic compositions of ATRLPs and epoxy resins containing fumed silica. These examples are not to be construed as limiting in any way the invention claimed herein.

EXAMPLES

Five samples A to G were prepared by mixing an ATRLP and an epoxy resin, as well as other ingredients, at room temperature, in the order listed below and then tested to determine gel times thereof. The tests conducted on the samples included gel time which is defined as the time it takes to exotherm 10° C. from 25° C. to 35° C.; viscosities at low and high rpm with Brookfield Model RVT, spindle #7 at 25° C.; and thixotropic index which is the ratio of low shear viscosity to high shear viscosity. Composition of the samples in parts by weight and test results on the samples are given in Table II, below:

TABLE II

|  | A | B | C | D | E | F | G |
|---|---|---|---|---|---|---|---|
| ATRLP | 28.0 |  |  |  |  |  |  |
| TETA | 11.6 |  |  |  |  |  |  |
| Nonyl Phenol | 1.0 |  |  |  |  |  |  |
| Epoxy Resin | 100.0 |  |  |  |  |  |  |
| Fumed Silica | — | 2.4 | 5.7 | — | 5.7 | — | 5.7 |
| Clay | — | — | — | 14.2 | 14.2 | — | — |
| Calcium Carbonate | — | — | — | — | — | 28.4 | 28.4 |
| Gel time, min. | 20 | 27 | 30 | 15 | 11 | 20 | 20 |
| Viscosity at 20 rpm, cps | 15,600 | 45,000 | 86,200[1] | 20,200 | 1,832,000[3] | 23,200 | 1,620,000[3] |
| Viscosity at 50 rpm, cps | 14,880 | 34,080 | 60,400[2] | 18,000 | 579,200[4] | 20,880 | 772,800[4] |
| Thixotropic Index | 1.05 | 1.32 | 1.43 | 1.12 | 3.16 | 1.11 | 2.10 |

[1] Viscosity measured at 10 rpm
[2] Viscosity measured at 20 rpm
[3] Viscosity measured at 1.0 rpm
[4] Viscosity measured at 2.5 rpm The ATRLP used in Table II was amine terminated butadiene acrylonitrile liquid polymer which had a Brookfield viscosity at 27° C. of 225,000 cps, a total amine equivalent weight of 800 to 1000, and an acrylonitrile content of 16.5%. TETA is a designation for triethylenetetramine, a curing or a crosslinking agent for epoxy resins. Nonyl phenol is a curing catalyst for ATRLP/epoxy compositions which activates the curing agent. Epon 828 is an epoxy resin, more specifically identified as a light colored low molecular weight diglycidyl ether of bisphenol-A. The viscosity of the Epon 828 epoxy resin is about 100 to 160 poises measured at 25° C. and its gram equivalent weight is 185 to 192. Clay was powdered bentonite, an aluminum silicate. Fumed silica was Cab-O-Sil with a purity of 99.0%, exterior surface area of about 200 m$^2$/g, super fine with over $11 \times 10^{15}$ particles per gram, and less than 2% moisture under normal conditions. Calcium carbonate, the mildly alkaline material used herein, was Camel-Wite which has essentially all particles of less than 10 microns with an average of 2 microns.

On the basis of the results provided in Table II, above, it is evident that addition of 2.4 parts and 5.7 parts of fumed silica to the ATRLP/epoxy compositions B and C retarded gel times thereof a great deal. Whereas gel time for the control sample A, which was devoid of fumed silica, was 20 minutes, this time increased to 27 and 30 minutes as amount of fumed silica was increased to 2.4 parts and 5.7 parts, respectively. The thixotropic effect of fumed silica is reflected by the thixotropic index which was 1.05 for the control sample A and increased to 1.32 and 1.43 for the samples B and C containing fumed silica. Sample D corresponded to the control to which 14.2 parts of bentonite clay was added. As shown in Table II, sample D showed a 25% reduction in gel time over the control but a negligible increase in the thixotropic index. Sample E, which corresponds to the composition of this invention, contained a combination of 5.7 parts fumed silica and 14.2 parts of clay, showed an almost 50% reduction in gel time over the control and a tripling of the thixotropic index. Sample F contained 28.4 parts of Camel-Wite calcium carbonate and showed no appreciable difference in gel time nor in thixotropic index over the control, however, the results were different when 5.7 parts of fumed silica and 28.4 parts of calcium carbonate were admixed to make composition G. The combination of fumed silica and calcium carbonate in sample G did not retard gel time of the ATRLP/epoxy composition yielding the same time of 20 minutes as for the control, however, this combination doubled the thixotropic index when compared with the control.

We claim:

1. A curable thixotropic composition of matter comprising an amine terminated reactive liquid polymer, epoxy resin, sufficient amount of fumed silica to render said composition thixotropic, and a sufficient amount of a mildly alkaline solid substance selected from silicate clays, calcium carbonate, and mixtures thereof, to accelerate gel time thereof.

2. Composition of claim 1 wherein amount of fumed silica is from 0.5 to 15 parts per 100 parts of the amine terminated reactive liquid polymer and epoxy resin, whereas amount of the alkaline material is from 1 to 100 parts, on the same basis.

3. Composition of claim 1 having thixotropic index greater than 1.5 wherein amount of fumed silica is from 2 to 10 parts and amount of the alkaline material is 5 to 50 parts, based on 100 parts of the amine terminated reactive liquid polymer and epoxy resin, and the alkaline material is selected from aluminum silicate clays, calcium carbonate, and mixtures thereof.

4. Composition of claim 2 wherein relative amount of the amine terminated reactive liquid polymer is about 1 to 100 parts per 100 parts of the epoxy resin, the liquid polymer having an average of about 1.5 to 4 amine groups per molecule, said groups being primary, secondary, or a mixture thereof, the liquid polymer having the formula

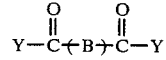

wherein Y is a univalent radical obtained by removing hydrogen from an amine group of an aliphatic, alicyclic, heterocyclic or aromatic amine containing from 2 to 20 carbon atoms and at least two amine groups, at least two of said amine groups being primary, secondary or a mixture thereof, and B is a polymeric backbone comprising carbon-carbon linkages and containing polymerized units of at least one vinylidene monomer having at least one terminal $CH_2=C<$ group, said monomer being selected from the group consisting of (a) monoolefins containing 2 to 14 carbon atoms, (b) dienes containing 4 to 10 carbon atoms, (c) vinyl and allyl esters of carboxylic acids containing 2 to 8 carbon atoms, (d) vinyl and allyl ethers of alkyl radicals containing 1 to 8 carbon atoms, and (e) acrylic acids and acrylates having the formula

said R being hydrogen or an alkyl radical containing 1 to 3 carbon atoms and said $R^1$ being hydrogen, an alkyl radical containing 1 to 18 carbon atoms, or an alkoxyalkyl, alkylthioalkyl or cyanoalkyl radical containing 2 to 12 carbon atoms; and wherein said epoxy resin is a glycidyl ether resin with an epoxy equivalent of about 70 to 2,000.

5. Composition of claim 4 wherein the epoxy resin is selected from alkanediol diglycidyl ethers, di and polyglycidyl ethers of bisphenols, and mixtures thereof.

6. Composition of claim 5 including a sufficient amount of a curing agent to crosslink the amine terminated liquid polymer-epoxy composition and sufficient amount of a curing catalyst to activate the curing agent.

* * * * *